United States Patent [19]

Ban et al.

[11] Patent Number: 4,506,721
[45] Date of Patent: Mar. 26, 1985

[54] METHOD FOR PRODUCTION OF FIBER-REINFORCED COMPOSITE MATERIAL

[75] Inventors: Keisuke Ban, Fujimi; Takeo Arai, Tokyo; Tatsuo Sakakibara; Noriaki Miyake, both of Ueda, all of Japan

[73] Assignee: Honda Giken Kogyo Kabushiki Kaisha, Tokyo, Japan

[21] Appl. No.: 470,630

[22] Filed: Apr. 18, 1983

Related U.S. Application Data

[63] Continuation of Ser. No. 914,297, Jun. 9, 1978, abandoned, which is a continuation of Ser. No. 725,990, Sep. 23, 1976, abandoned.

[30] Foreign Application Priority Data

Sep. 30, 1975 [JP] Japan .............................. 50-118690

[51] Int. Cl.³ ...................... B22D 19/14; B22D 18/02
[52] U.S. Cl. ...................................... 164/97; 164/108; 164/120

[58] Field of Search ................. 164/4, 91, 97, 98, 108, 164/113, 120, 133, 154, 155

[56] References Cited

U.S. PATENT DOCUMENTS 4,033,400  7/1977  Gurwell et al. ................ 164/120 X Primary Examiner—Nicholas P. Godici
Assistant Examiner—J. Reed Batten, Jr.
Attorney, Agent, or Firm—Armstrong, Nikaido, Marmelstein & Kubovcik

[57] ABSTRACT

A method for producing a fiber reinforced composite body, wherein a shaped body of inorganic fiber or a sintered body of metal or ceramic material is placed in a metal mold, and a melt of a metal alloy as a matrix is caused to be penetrated or impregnated into the shaped body by a high pressure solidification casting method so that the matrix may perfectly fill in the voids or pores of the shaped body and solidify to be a desired composite body.

5 Claims, 8 Drawing Figures

METHOD FOR PRODUCTION OF FIBER-REINFORCED COMPOSITE MATERIAL

This is a continuation of application Ser. No. 914,297, filed June 9, 1978, which is a continuation of application Ser. No. 725,990, filed Sept. 23, 1976, both now abandoned.

BACKGROUND OF THE INVENTION

This invention relates to a method for production of fiber-reinforced composite material, and a casting mold for producing the same.

As the method for producing the fiber-reinforced composite material having a metal matrix, there have so far been known an autoclave method, a sintering method, a hot-press method, and so on. Of these methods, the autoclave method affords the use of a fiber shaped body, into which an alloy material to be the matrix can be penetrated or impregnated in its molten state under pressure, so that the method is advantageous in its low degree of the fiber rupture. On the other hand, however, the manufacturing step in this method is complicated, and, in view of its use of a pressurized container or vessel, the degree of pressure application is limited with the consequence that reinforcement of the matrix per se, shaping of the body into a desired configuration, and making of a partial composite body in a structural object such as, for example, reinforcement of the head part of a piston for an automobile engine, and so forth with such composite body becomes difficult.

The sintering method and the hot-press method, on the other hand, mainly use powders of metals and their alloys as the matrix. Therefore, these methods require mixing of the powder and the fiber to constitute the desired composite body, and, in their process steps, must apply pressure to the mixed material until the solid phase of the material is attained, as a result of which the fiber material tends to be ruptured, and no sufficient reinforcement by the fiber material can be attained. Moreover, the methods are difficult to carry out the shaping of the mixed material into desired configurations, the making of the partial composite structure in the shaped body, and the reinforcement of the matrix.

SUMMARY OF THE INVENTION

In view of the foregoing state of the art, it is an object of the present invention to provide an improved method for producing, on an industrialized mass-production scale and at a lower manufacturing cost, composite material having excellent reinforcement property, by which various problems inherent in the aforedescribed conventional methods can be solved, and the shaping of the body into a desired configuration, the making of the partial composite structure in the shaped body, and the reinforcement of the matrix can be carried out quite easily.

The characteristic feature of the present invention resides in forming inorganic fibers into any arbitrary shape, and filling a matrix material such as, for example, cast iron, copper, aluminum, magnesium, or alloys of these metals into the shaped body of the inorganic fibers by means of the high pressure solidification casting method to obtain the desired composite body.

The foregoing object, and other objects, as the well as construction and function of the present invention will become more apparent and understandable from the following detailed description thereof, when read in conjunction with the accompanying drawing.

BRIEF DESCRIPTION OF THE ACCOMPANYING DRAWING

Figure 7:
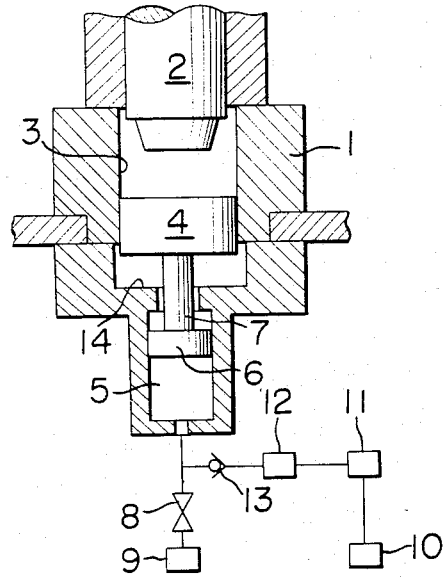
Figure 8:
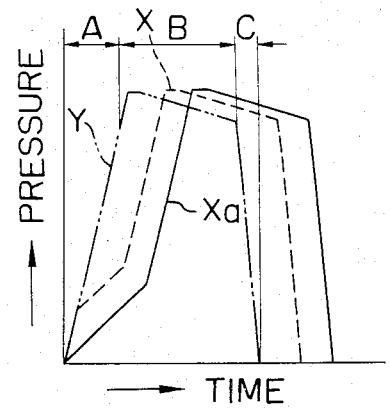

FIG. 7 is a longitudinal cross-section of one embodiment of a casting mold to be used for putting the method of the present invention into practice; and FIG. 8 is a graphical representation showing the relationship between pressure and time in the high pressure solidification casting method to be adopted for the purpose of the present invention, wherein the curve X is of the composite material produced in accordance with the present invention, and the curve Y is of a comparative material.

DETAILED DESCRIPTION OF PREFERRED EMBODIMENT

The high pressure solidification casting method for use in the present invention is a technique, in which a melt of a metal material as a matrix is caused, at the time of the casting, to solidify, while a static high pressure of 50 kg/cm$^2$ to 2,000 kg/cm$^2$ is being applied to the melt, whereby the solidification point of the melt is raised, and a compact cast product can be obtained, while being accompanied by a squeeze solidification.

Figure 1:
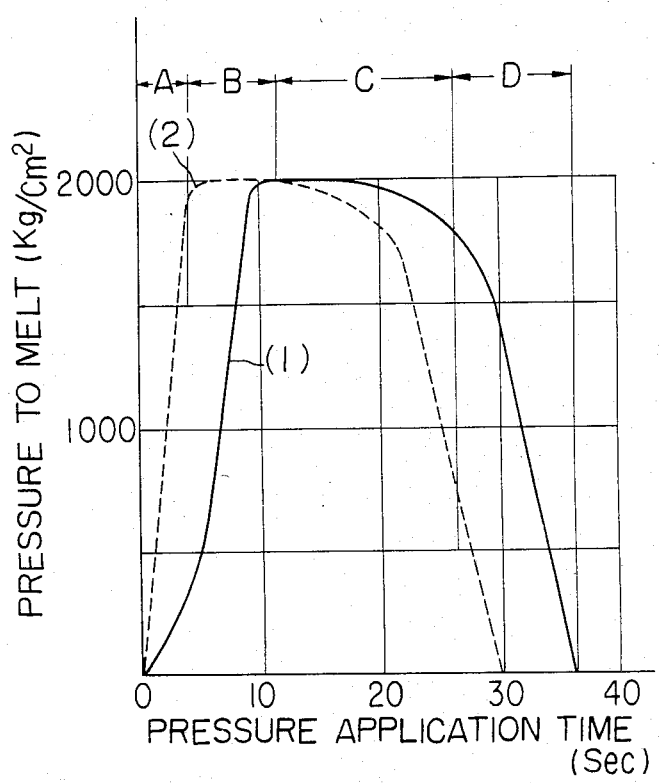
FIG. 1 is a graphical representation showing the relationship between the pressure application time and pressure of the melt in the filling and the composing steps according to the present invention.

Referring now to FIG. 1 which shows the relationship between the pressure of the melt and time for applying pressure in the course of filling the melt into the shaped body of fiber in accordance with the present invention, wherein a curve (1) in solid line represents a case, in which a shaped body of fiber having a volume of 38.5 cm$^3$ and a bulk density of 0.3 g/cm$^3$, and the matrix consisting of an aluminum alloy (AC8B material in accordance with the Japanese Industrial Standard) are used for the process, and both materials are cast at a casting temperature of 780° C. Curve (2) in dotted line shows the case, in which no shaped body of fiber is used. Reference letters A, B, C, and D indicate, respectively, a filling region, a pressure applying region for producing the composite body, a squeeze solidification region, and a solidification region.

As will be apparent from the curve (1) in FIG. 1, the static pressure to be imparted to the melt due to compression of the shaped body of fiber and penetration and combination of the melt into and with the fiber shaped body in the region A rises relatively gently in comparison with the curve (2), so that the melt can be filled in the fiber shaped body in a perfect molten state. Therefore, rapid application of a static pressure is effected in the region B followed by the squeeze solidification in the region C and completion of the solidification in a short time period in the region D. On account of this, a very satisfactory combining of operations between the fiber shaped body and the matrix can be expected to obtain a desired composite material. And yet, since the combining operations are carried out under a high pressure to promote rapid solidification, the degree of contact between the reinforcing fibers and the matrix is high, hence the resulted composite material is highly compact, and, at the same time, reinforcement of the matrix per se is remarkable.

Figure 2:
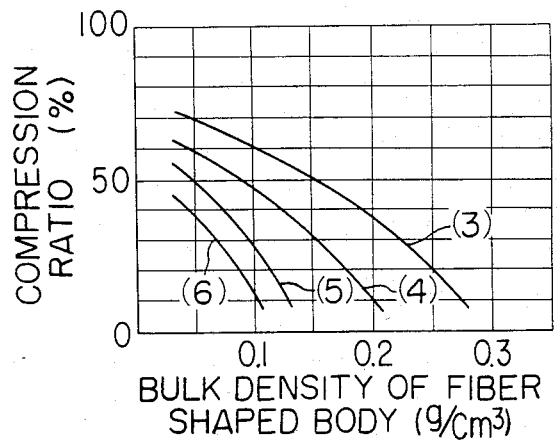
FIG. 2 is a graphical representation showing the relationship between the bulk density of the shaped body of fibers and the compression ratio.

The graphical representation in FIG. 2 shows the relationship between bulk density of the fiber shaped bodies (Sample Nos. 3 to 6 shown in the following Table) and compression ratio. The curves (3) to (6) in the graphical representation respectively correspond to the fiber shaped bodies 3 to 6 in the Table.

TABLE

| Initial size of the fiber shaped bodies | 70 mm in diameter and 10 mm in thickness | |
|---|---|---|
| Matrix | aluminum alloy (ACBB material in accordance with the Japanese Industrial Standard) | |
| Static pressure | 2,000 kg/cm$^2$ | |
| Casting temperature | 780° C. | |
| Sample No. | Composition of Fiber Shaped Body | Diameter of Fiber |
| (3) | Crystallized glass fiber Carbon fiber (having coating layer of diffusion layer of copper or nickel) | 5-10 microns |
| (4) | Crystallized glass fiber Carbon fiber Ceramic fiber | 5-10 microns  3 microns |
| (5) | Chromium fiber | 3-5 microns |
| (6) | Asbesto | 5-10 microns |

Figure 3:
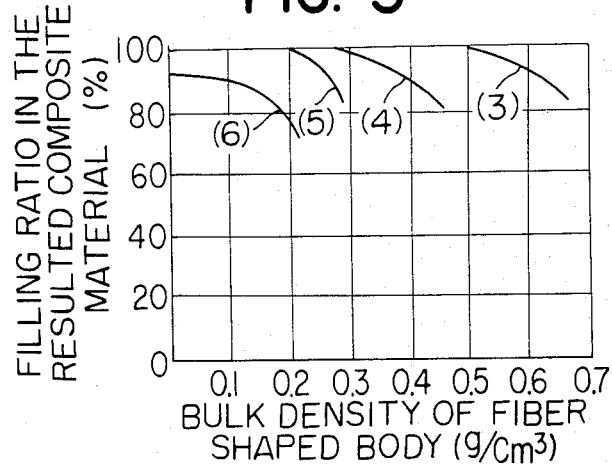
FIG. 3 is a graphical representation showing the relationship between the bulk density of the shaped body of fibers and the filling ratio after it is made into a composite material.

The graphical representation in FIG. 3 shows the relationship between the bulk density of the fiber shaped bodies (3) to (6) given above and the filling ratio in the resulted composite body.

As is apparent from FIG. 2, the fiber shaped article of low bulk density is subjected to a higher compression than that of the high bulk density, but the filling ratio of fiber in the resulting composite body is not very much different owing to the bulk density. Accordingly, there take place only changes in the initial size of the fiber shaped body with respect to the bulk density thereof, the quantity of the melt to be penetrated into the fiber shaped body, and the mold stroke to press the melt from the standpoint of volume, hence the influences of these changes on the production of the composite material are relatively minor. Further, even in the case of using fibers of long length, there occurs no problem at all in the penetration of the melt into the fiber shaped body, but the melt begins to solidify immediately after it is penetrated and filled in the fiber shaped body, on account of which there takes place neither breakage nor deformation of the fiber material due to pressure being applied to the fiber shaped body in the course of the solidification. Therefore, in consideration of obtaining a sufficient strength in the resulting composite material, and sufficient entanglement of the fiber materials at the time of producing the fiber shaped body, and in view of the fact that there is no restriction at all to the fiber length from the standpoint of producing the fiber shaped material, the fiber to be used as the reinforcement material for the purpose of the present invention should preferably be of a long length.

As shown in FIGS. 2 and 3, when the fibers (inclusive of whiskers) having on the surface thereof a coated layer of metals such as copper, nickel, silver, and so on, or having a diffusion layer of such metals formed in the surface part of the fiber are used, there is brought about a solid-solution phenomenon between the abovementioned metal-coated layer and the matrix, or a diffusion phenomenon between the diffusion layer and the matrix with the result that the wetting property of the fiber shaped body with the matrix improves, and the compression force on the fiber shaped body is small. Therefore, it becomes possible to produce the composite material from the shaped body having a large bulk density.

The critical conditions for producing the composite material according to the method of the present invention are determined by an increase in resistance of the fiber shaped body against penetration of the melt prior to completion of the total filling or in the course of the filling, due to which the static pressure of the melt begins to rise. In this case, the bulk density of the fiber shaped body and the wetting property of the fiber shaped body with respect to the matrix constitute the governing factors. The upper limit of the bulk density is 0.6 g/cm$^3$ or so. Besides these, the melting point of the matrix, heat capacity, range of solidification, heat of solidification, heat capacity and heat transfer ratio of the fiber shaped body have influence on the composite material to be obtained.

The present invention is significant in that it is not subjected to any restriction to the matrix, since the melt can be penetrated into the fiber shaped body in its perfectly molten state as mentioned above, after which the melt is rapidly solidified. More specifically, take an aluminum alloy to be described later as an example. According to the conventional method, it has been difficult to produce the composite material by the use of substances which yield a large amount of initial hard crystals such as, for example, excessive eutectic silicon alloy of 23%. Even with such material, however, the method of the present invention is perfectly feasible for producing the desired composite material without encountering any trouble whatsoever in filling such metal alloy into the fiber shaped body and with no apprehension of the fibers being broken during the process, which has so far been considered difficult to obtain according to the conventional method. Further, at the time of producing the fiber shaped body, the fibers can be oriented two-dimensionally, the orientation of which can be maintained even in the resulting composite material, which is highly effective in improving the bending strength of the composite material.

As stated in the foregoing, the present invention makes it possible to produce not only a structural object, in which a large volume of fiber shaped body is incorporated in the entire matrix to form a composite structure, but also a structural object, in which the fiber shaped body is filled in one desired portion of the structural object and composed to be a partial composite structure, hence it has very wide range of applications. The present invention is also capable of preventing the structural object from deterioration in strength and hardness at high temperature, of improving its sliding characteristic, of restricting its thermal expansion, and of controlling its heat transfer property and electric resistance.

With a view to enabling those persons skilled in the art to put the present invention into practice, the following preferred examples are presented. It should, however, be noted that the present invention is not limited to these examples alone.

EXAMPLE I (Reinforcement in the head part of a piston in internal combustion engine)

Fiber Shaped Body:

Fiber used: crystallized glass fiber
Fiber diameter: 5 to 12 microns
Fiber length: 170 mm (at maximum)
Dimension of fiber shaped body: 70 mm in diameter, and 10 mm in thickness
Bulk density: 0.3 g/cm³

The above specified fiber shaped body is placed in a shaping mold for a producing a piston for 4-cycle engine having an inner diameter (bore) of 70 mm. As the matrix to be reinforced, Lo-Ex (AC8B material in accordance with the Japanese Industrial Standard) is used. The casting operations are carried out at a casting temperature of 780° C., a pressure of 1,800 kg/cm², and a holding time of 2 minutes, whereby the desired piston is produced. In the course of these casting operations, the abovementioned fiber shaped body is filled and composed on the top portion of the piston head.

From this composite portion of the piston head, a sample X is taken to examine the filling ratio of the fiber in this composite part. It is found out that the ratio is 15% by weight with respect to the matrix, and the thermal expansion coefficient is $15 \sim 13 \times 10^{-6}$.

Figure 4:
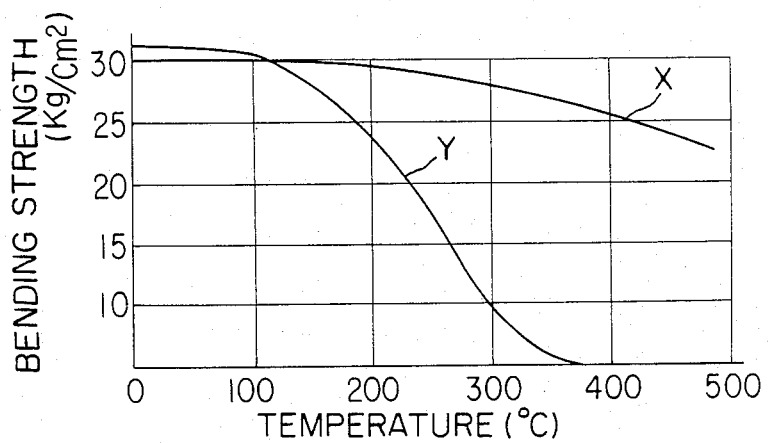
FIG. 4 is a graphical representation showing the relationship between temperature and bending strength of the composite body produced in accordance with the present invention, and of a comparative material.
Figure 5:
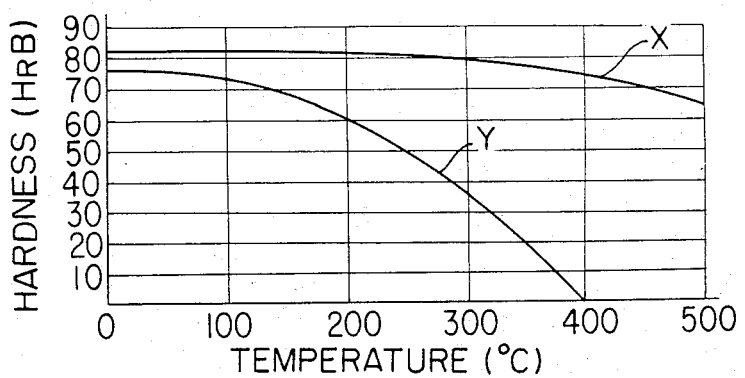
FIG. 5 is a graphical representation showing the relationship between temperature and hardness of the composite material produced in accordance with the present invention, and of a comparative material.
Figure 6:
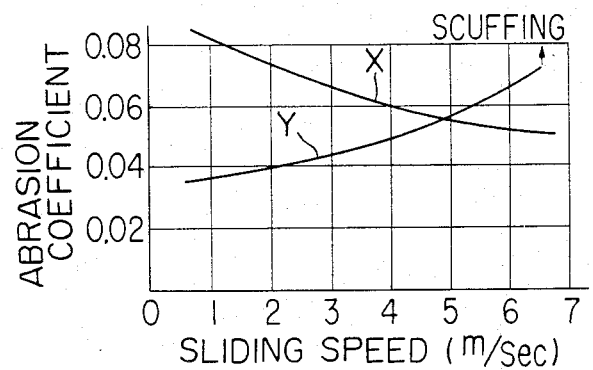
FIG. 6 is a graphical representation showing the relationship between sliding speed and abrasion coefficient of the composite material produced in accordance with the present invention, and of a comparative material.

FIGS. 4, 5, and 6 respectively indicate the results of the surface strength test of the sample X, the hardness deterioration test of the sample after holding the same at each of the specified temperatures for 50 hours, and the sliding characteristic test of the composite material. The curve Y in each of FIGS. 4, 5, and 6 shows the results of the tests conducted on the AC8B material as the comparative sample through heat-treatment (the quality classification of "T6").

As will be apparent from the respective graphical representations, the test sample of the present invention as indicated by the curve X is superior to the comparative sample as indicated by the curve Y in its bending strength, hardness, and sliding property.

Further, when the boundary between the composite structure and the simple matrix of the piston is heated by a burner, only the portion of Lo-Ex is completely melted and the composite portion perfectly retains its original shape, so that improvement in the heat-resistant property at this composite portion can be recognized.

EXAMPLE II

A fiber shaped body having a bulk density of 0.3 g/cm³ and Lo-Ex as the matrix to be reinforced are mutually combined to form composite portions in the head part, the ring-land part, and the skirt part of a piston for a 4-cycle engine in accordance with the method of the present invention. The shaping mold has an inner diameter (bore) for reinforcement of 55.5 mm at the head part, the ring-land part, and the skirt part of the piston. Incidentally, the initial size of the fiber shaped body, in this case, estimatedly includes the compression ratio in the abovementioned bulk density, and the body is ultimately shaped by punching in the course of the casting operation.

The abovementioned composite portion exhibits physical properties similar to those of Example I. In addition, it also reveals itself to be effective against wear of the grooves for the piston ring, thermal expansion at the skirt part, scuffing, and abrasion. Consequently, maintenance of mechanical strength at high temperature, improvement in the sliding characteristics, and restriction of the thermal expansion of the piston become possible, so that blow-off of the piston head and scuffing of the skirt part of the piston can be successfully prevented.

Furthermore, there is no trouble whatsoever in filling the fiber shaped body even with SILMIN (AC4A material in accordance with Japanese Industrial Standard) and excessive eutectic silicon alloy to produce the composite body, and similar physical properties are obtained in the composite material.

Besides the above, as other examples of selective use of the bulk density and kinds of fiber necessary for meeting particular mechanical strength or sliding characteristic required of any other specific composite portions in a body, a shaped body of crystallized glass having a bulk density of 0.4 g/cm³ is used for filling in and being composed with the head and ring-land parts of the piston, and, also, a shaped body of carbon fiber having a bulk density of 0.3 g/cm³ is used for filling in and being composed with the skirt part of the piston taking into consideration its sliding property with the cylinder. The results obtained are all satisfactory.

EXAMPLE III (Reinforcement in a rod portion of a connecting rod for engine)

A connecting rod having a dimension of 36 mm in diameter at the large diameter end, 18 mm in diameter at the small diameter end, and 120 mm in length, and made of AC4A material in accordance with the Japanese Industrial Standard is used for reinforcing its rod portion by filling and composing therein a fiber shaped body in a parallelpiped shape having a dimension of 80 mm × 8 mm × 10 mm, and a bulk density of 0.4 g/cm³ in accordance with the method of the present invention. As a result of tests run on the thus obtained composite structure, it is found that mechanical strength and rigidity of the connecting rod has been improved.

EXAMPLE IV (Reinforcement of cylinder sleeve for engine and improvement in its sliding characteristic)

Into the inner wall of the cylinder sleeve for an engine having an inner diameter (bore) of 30 mm and made of AC8B material in accordance with the Japanese Industrial Standard, there is filled a cylindrical fiber shaped body having a dimension of 45 mm in outer diameter, 30 mm in inner diameter, and 80 mm in length and a bulk density of 0.5 g/cm³ in accordance with the method of the present invention, thereby producing the composite cylinder sleeve.

As a result of this reinforcement process, it has been found out that the cylinder sleeve is excellent in its anti-scuffing and anti-abrasion properties, which is comparable to a cylinder sleeve made of excessive eutectic silicon alloy, and a cylinder sleeve plated with hard chromium.

EXAMPLE V (Application to bearing with back metal)

AC4A material in accordance with the Japanese Industrial Standard is used as the matrix, into which a shaped body of carbon fiber having a fiber length of 6 to 10 mm and a bulk density of 0.2 g/cm$^3$ is filled and combined in pursuance of the method of the present invention. After this, the thus obtained composite material is intimately adhered to a steel plate of 1.5 mm in thickness, on which copper is plated. The laminated structure is processed to be finished to a plate of 2.0 mm in thickness, and then subjected to sliding and fatigue tests. As a result, it has been found out that the composite plate is superior to conventional aluminum plate in its anti-scuffing, anti-abrasion, and anti-fatigue properties.

Besides the afore-described various examples, the method according to the present invention is capable of improving the mechanical strength of the root portions of various gear teeth, thereby preventing the gear faces from undergoing wear and tear, and of improving precision in inter-shaft arrangement in light metal covers by filling and composing in the inter-shaft arrangement such fiber shaped body, which serves as the measures to the thermal expansion of the shaft portions at the time of their being subjected to the hot condition.

The afore-explained method is carried out by causing a melt to penetrate sufficiently into a fiber shaped body having a certain definite bulk density (porosity) at the initial stage of applying a static high pressure, and by utilizing a delay in the propagating speed of the pressure to the melt, i.e., delay in solidification of the melt, to be caused by the compression to the fiber shaped body to some extent, followed by solidification of the melt under the static high pressure.

In the above-described method, satisfactory penetration of the melt can be carried out upto a certain definite value of the density of the fiber shaped body, although, when the density of the fiber shaped body becomes high, resistance against penetration of the melt into the fiber shaped body increases with the result that the propagation speed of pressure with respect to the melt becomes rapid before the melt perfectly penetrates into the fiber shaped body, whereby there accrues a problem such that the solidification of the melt starts. Further, when the volume ratio of the fiber shaped body with respect to the cavity is high, there is the disadvantage that overflow of the melt occurs at the time of the pressure application due to rise in the draft of the melt at the time of pouring the same. Consequently, the mold stroke should be made larger for delaying the propagation speed of the pressure at the initial stage of its application to the melt.

With a view to solving the abovementioned various problems, and to carrying out perfect penetration of the melt even in the case of using the fiber shaped body having a high density, the present invention proposes that the fiber shaped body, or a sintered body, and the melt of an alloy be put in the molding cavity of the casting mold, and, while controlling the propagation speed of the pressure to be applied to the melt at the initial stage of applying such static high pressure, the abovementioned fiber shaped body or the sintered body be combined with the melt of the alloy so as to be made into a desired composite body.

For the above-described fiber shaped body, there can be used metallic fiber crystallized glass fiber, carbon fiber, ceramic fiber, chromium fiber, and other inorganic fibers, any appropriate one of which is formed into any desired shape. For the sintered body, there can be used aluminum, copper and other appropriate metals, and ceramic sintered bodies of aluminum oxide, carbon, and silicon type. The alloys to be used as the matrix may be those of copper, aluminum, magnesium, tin, and so on.

FIG. 7 shows one embodiment of the casting mold to put the afore-described high pressure solidification casting method of the present invention into practice. In the drawing, a metal mold 1 is provided on the top part thereof with a pressure applying punch 2 which is made freely slidable, and an opposite punch 4 which faces the pressure applying punch 2 in a mold cavity 3 and constitutes the bottom surface of the cavity 3. The opposite punch 4 is supported in the mold cavity in a freely slidable manner, and is connected, through a rod 7, to a piston 6 of a hydraulic cylinder 5 provided at the lower part of the metal mold 1. Oil in the hydraulic cylinder 5 escapes into an oil sump 9 through an orifice 8. Feeding of the oil from an oil sump 10 to the hydraulic cylinder 5 is effected by a pump 11 through an accumulator 12, and a back-flow prevention valve 13 the hydraulic cylinder serves as a damper. Reference numeral 14 in the drawing designates a stopper surface of the opposite punch 4.

In the above-described construction of the metal mold according to the present invention, when the fiber shaped body is placed in the molding cavity 3, then a melt of an alloy is poured thereonto, and, after this, a static high pressure is applied to the melt by lowering the pressure applying punch 2, the punch comes downward by the action of the hydraulic cylinder 5, and, at the initial stage of its pressure application, retards the propagation speed of the pressure to the melt, thereby effecting the penetration of the melt into the fiber shaped body. As the result of this, the melt sufficiently penetrates into the fiber shaped body without being solidified until the pressure applying punch 2 reaches the stopper surface 14 of the opposite punch 4. The perfect solidification of the melt takes place upon arrival of the opposite punch 2 at the stopper surface 14 of the punch 4.

FIG. 8 is a graphical representation showing the relationship between time and pressure in the above-described process steps, wherein curve X represents the high pressure solidification casting method according to the present invention, and curve Y represents the conventional high pressure solidification casting method. Divided sections A, B, and C in the absissa of the graph respectively denote a pressure application region, a semi-solidification region (or squeeze solidification region), and a solidification region according to the conventional high pressure solidification casting method.

As is apparent from FIG. 8, the high pressure solidification casting method according to the present invention is capable of delaying the time from the start of the pressure application at the region A to the solidification of the melt at the region C through its semi-solidification at the region B to a considerable extent by the action of the abovementioned cylinder 5. Therefore, by adjusting the initial set value of the hydraulic cylinder 5, the degree of opening of the orifice, stroke of the punch 2 upto the stopper surface of the opposite punch 4, and so forth, it becomes possible to readily obtain the pressure application curve required for carrying out the process within a range as indicated by the curve X and a curve Xa in FIG. 8.

For the buffer means, a spring may be used. Such buffer means may be provided at the side of the pressure applying punch. Further, it is preferable that, prior to the casting operation, the fiber shaped body, etc. be subjected to drawing of air therefrom to make it free from oxygen, or to replacement by an inactive gas so as to prevent the melt from oxidation. This process step is particularly effective when a melt of magnesium alloy is used as the matrix, since the melt of magnesium is liable to be subjected to a considerable oxidation phenomenon when it is going to penetrate into the pores or voids of the fiber shaped body, etc.

As explained in the foregoing, according to the present invention, it is possible to cause the melt to be sufficiently penetrated deep into the interior of the fiber shaped body even when such shaped body is of high density, for the metal material can be maintained in its molten state by delaying the propagation speed or applying pressure to the melt at the initial stage of applying the static high pressure. It is also possible, according to the present invention, that the melt is prevented from overflowing by adjustment of the damper mechanism. Furthermore, any arbitrary melt of alloy material can be made to penetrated even into sintered bodies of relatively low mechanical strength to make them satisfactory composite bodies without impairing their sintered structure, and without in the use of complicated process steps such as in the autoclave method, and others, so that composite bodies of ceramic which have so far been unobtainable by the ordinary casting method, etc. can be produced by the method of the present invention with satisfactory result.

Although the present invention has been described in detail in the foregoing with reference to several preferred examples thereof, it should be understood that these examples are merely illustrative and not restrictive, and that any change and modification in the materials to be used, treating conditions, and so on may be made by those skilled in the art within the spirit and scope of the present invention as recited in the appended claims.

What is claimed is:

1. A method of producing fiber reinforced composite material by application of high pressure which comprises: the steps of preforming an inorganic fiber material into a shaped body of an arbitrary configuration with a bulk density of 0.6 g/cm$^3$ or less; causing a matrix consisting of metals or alloys thereof in molten state to penetrate into the shaped body by continuously applying pressure to the melt penetrating into the shaped body; said pressure being applied in stages wherein: in a first filling stage the pressure applied to the melt is maintained at a low positive value so that the melt is maintained in molten state and, prior to partial solidification of the melt taking place, the melt fully fills the fiber-shaped body of relatively low bulk density without the body exerting any substantial resistance to penetration of the melt, in a second pressure application stage, the pressure is increased rapidly and the melt begins to solidify, in a third squeeze solidification stage the pressure is initially maintained at a substantially constant value and thereafter is decreased and during this third stage, the melt squeeze-solidifies under high pressure and is integrally combined with the fiber-shaped body, and in a fourth solidification stage, the pressure is rapidly reduced in a short period of time so as to allow complete solidification of the melt.

2. The method for producing fiber reinforced composite material as set forth in claim 1, wherein said inorganic fiber material is at least one selected from the group consisting of metallic fiber, crystallized glass fiber, carbon fiber, ceramic fiber, and chromium fiber.

3. The method for producing fiber reinforced composite material as set forth in claim 1, wherein said sintered body is at least one selected from the group consisting of aluminum, copper, aluminum oxide, carbon, and silica type ceramic.

4. The method for producing fiber reinforced composite material as set forth in claim 1, wherein said matrix is at least one selected from the group consisting of cast iron, copper, aluminum, magnesium, tin, zinc, and alloys thereof.

5. A method of producing fiber reinforced composite material as claimed in claim 1 wherein said first stage has a period of several seconds, said second stage extends beyond 10 seconds, said third stage beyond 20 seconds and said fourth stage beyond 30 seconds.

* * * * *